March 28, 1933.  A. MARONE  1,902,873
CHAIN CONVEYING APPARATUS
Filed May 28, 1930
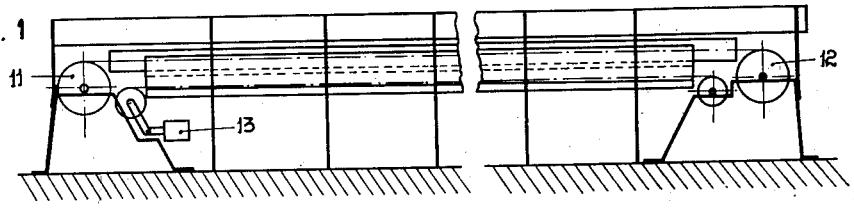
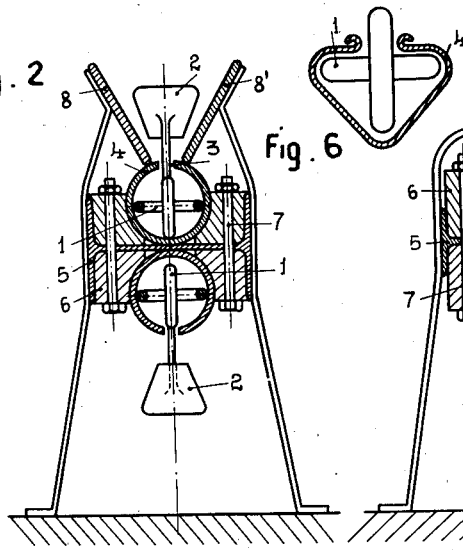
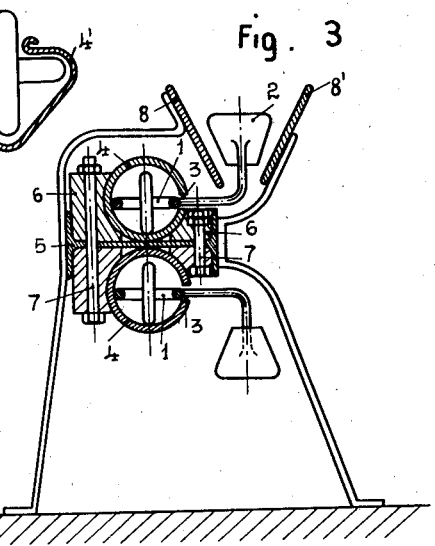
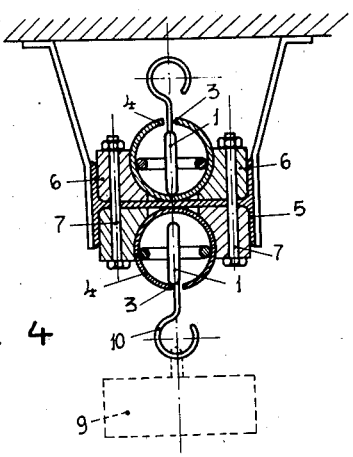
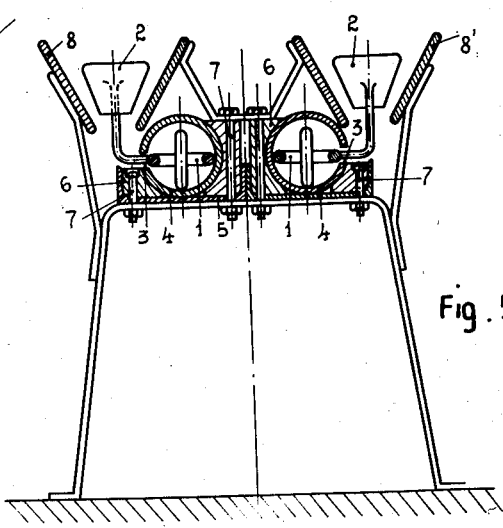
Inventor.
Alfredo Marone,
By Henry Orth Jr
Atty Patented Mar. 28, 1933

1,902,873

UNITED STATES PATENT OFFICE

ALFREDO MARONE, OF SANTA VITTORIA D'ALBA, ITALY

CHAIN CONVEYING APPARATUS

Application filed May 28, 1930, Serial No. 456,414, and in Italy June 17, 1929.

This invention relates to an endless conveying apparatus in which the endless member is guided in a tube having a longitudinal slot through which pass the arms of the receptacles or the like secured to the endless member.

It has already been proposed to employ conveyers of this type, in which the endless member consists of a solid rope or cable, substantially circular in cross section. The use of this endless member limits the range of variation of the conveyer path owing to the considerable friction generated.

The object of this invention is to replace the rope or cable by an interlocked ring chain by which it is possible to reduce the friction and consequently the power consumption, as well as to vary at will the conveyer path and to employ tubes having relatively thin walls for guiding the chain.

According to the purpose for which the conveyer is used, its whole path or a part thereof may be utilized; in this latter case when a conveyer strand extending in one direction is utilized only, the returning strand is arranged according to this invention close to the former so that one support only and the same securing means for the tubes in both directions may be used.

When both sides of the conveyer are utilized for conveying articles and are guided on the same path it is obviously possible to utilize also the same supports and securing means.

Some constructional forms of the conveyer according to this invention will now be described, reference being had to the accompanying drawing.

Figure 1 is a diagrammatical side view showing the end sections of a conveyer plant according to this invention.

Figures 2, 3, 4 and 5 are cross sections on a larger scale showing modified forms and Fig. 6 shows a modified detail in section and on a larger scale.

Figure 2 shows a construction of the conveyer adapted for conveying articles of a determined type, such as bottles or other elongated articles, in which the conveyer is utilized as a single-strand conveyer only, its return side not being utilized.

The conveyor comprises an endless chain 1 to the vertical links whereof the flights 2 in the shape of blades are secured, these latter passing through a slit 3 longitudinally cut in the tubes 4 guiding the chain. The carrying and returning tubes are fixed by means of blocks 6 and bolts 7, common to both tubes, to the same support consisting e. g. of a double T-shaped iron 5.

On the upper side of the conveyor and laterally of the pulling blades 2 inclined side walls 8 and 8' are provided which form the supporting channel for the articles to be conveyed. The side walls 8 and 8' leave free at their lower end a slit for the passage of the shank of the conveyor blades 2. The double T-shaped iron and the channel 8—8' are supported on suitable pedestals conveniently anchored.

In the modified construction shown in Fig. 3 the flights are connected to the horizontal links of the chain and are curved at right angles so that the goods to be conveyed are situated laterally of the tubes 4.

This construction is more particularly convenient when the articles to be conveyed are subject to breakage (e. g. bottles) or carry along with them small foreign bodies that may fall off during travel, so that with the construction according to Fig. 2 the danger would arise of foreign bodies entering the tubes 4 through the slits 3 and disturbing the motion of the chain 1 in them so as to cause breakages in the conveyor members.

In the constructions shown it has been supposed to utilize the upper side of the conveyer but it is obvious that the lower section also can be utilized by placing under this latter a channel similar to the channel 8—8'.

Figure 4 shows a conveyer in which the articles 9 are conveyed by the lower chain side. For this purpose the chain links carry hooks 10 instead of blades.

It is obvious that the chain may be provided with crates or the like for the goods to be conveyed, instead of hooks.

Figure 5 shows a construction similar to that shown in Fig. 3, in which, however, both sides of the chain are working and arranged in tubes 4 placed side by side, that may be carried by a common support.

Referring to Figure 6 which shows a modification, the upper portion of the vertical links of the chain 1 passes through the slit cut in the tube 4' and this latter has a substantially triangular shape, which may prove particularly useful in some cases owing to the smaller play left to the chain links; in this construction the horizontal links assist in guiding and holding the chain in place during working.

In order to confer a continuous motion to the endless chain 1 a driving pulley 11 may be arranged at one end of the apparatus (Fig. 1) and moved by a suitable engine, not shown, an idler pulley 12 being arranged at the other end. In order to keep the chain stretched as desired within the tubes 4, a suitable tightening means 13 is provided at one or both conveyer ends which automatically and constantly adjusts the chain tension.

It will be obvious from the above description that the device is capable of some modification without material departure from the principles and spirit of the invention, and for this reason I do not desire to be understood as limiting myself to the precise form and arrangement of the several parts herein set forth in carrying out my invention in practice.

What I claim is:

In an endless conveyor, in combination with an endless chain with interlocked rings carrying means for conveying the articles, a tubular guide having a triangular cross section and a longitudinal slot substantially on the axis of one of the sides of the triangle, said guide closely embracing alternate chain rings, the outer rings partly engaging said slot, so as to prevent lateral displacements of the chain in the tubular guide during its travel in said guide.

In testimony that I claim the foregoing as my invention, I have signed my name.

ALFREDO MARONE.